(No Model.)  6 Sheets—Sheet 1.

O. S. HARMON.
Apparatus for Weighing and Packing Tobacco.

No. 236,579. Patented Jan. 11, 1881.

Fig. 1.

Attest:
Geo. M. Graham
T. H. Palmer

Inventor,
Orville S. Harmon,
by Munson & Philipp,
Attys.

(No Model.) 6 Sheets—Sheet 2.

O. S. HARMON.
Apparatus for Weighing and Packing Tobacco.

No. 236,579. Patented Jan. 11, 1881.

Attest:
Geo. H. Graham
T. H. Palmer

Inventor,
Orville S. Harmon,
by Munson & Philipp,
Attys.

(No Model.) 6 Sheets—Sheet 4.
O. S. HARMON.
Apparatus for Weighing and Packing Tobacco.
No. 236,579. Patented Jan. 11, 1881.

(No Model.)  6 Sheets—Sheet 5.

O. S. HARMON.
Apparatus for Weighing and Packing Tobacco.
No. 236,579.  Patented Jan. 11, 1881.

Attest:
Geo. H. Graham
J. H. Palmer

Inventor:
Orville S. Harmon,
by Munson & Philipp
Attys.

(No Model.) 6 Sheets—Sheet 6.

O. S. HARMON.
Apparatus for Weighing and Packing Tobacco.

No. 236,579. Patented Jan. 11, 1881.

Attest:
Geo. M. Galan
T. H. Palmer

Inventor,
Orville S. Harmon,
by Munson & Philipp
Attys.

UNITED STATES PATENT OFFICE.

ORVILLE S. HARMON, OF BROOKLYN, NEW YORK, ASSIGNOR TO P. LORILLARD & CO., OF JERSEY CITY, NEW JERSEY.

APPARATUS FOR WEIGHING AND PACKING TOBACCO.

SPECIFICATION forming part of Letters Patent No. 236,579, dated January 11, 1881.

Application filed October 12, 1880. (No model.)

*To all whom it may concern:*

Be it known that I, ORVILLE S. HARMON, a citizen of the United States, residing in the city of Brooklyn, county of Kings, and State of New York, have invented certain new and useful Improvements in Apparatus for Measuring Quantities of Tobacco and Similar Materials for Packing Purposes, fully described and represented in the following specification and the accompanying drawings, forming a part of the same.

The object of this invention is the automatic separation of material from the bulk into measured quantities suitable to form small commercial packages.

The invention principally consists in the combination, with a mechanism automatically operated by the material flowing from a bulk-containing bin or hopper, and operating so that when the proper quantity of material has entered the scale-pan of a weighing apparatus its weight shall suspend its flow, of a novel mechanism for discharging the measured material from the scale-pan and restoring the same into position to receive a new charge of material and cause the material to again flow; but the invention includes various combinations of mechanisms and constructions, too fully hereinafter pointed out and explained to need further preliminary description.

Though said invention is especially adapted to the measuring of tobacco and other filamentous, granulated, or comminuted substances, as tea, sugar, powder, spices, and the like, it may be used equally well with grain, seed, coffee, starch, shot, and similar materials; in short, with anything that is capable of being discharged from a bulk-containing bin, weighed in a scale, and dumped therefrom.

One embodiment of my improvements is shown in the accompanying drawings, in which—

The tobacco or other material to be operated upon is introduced in bulk within a bin or hopper, A, of suitable dimensions and shape and having an open bottom end.

Figure 3:
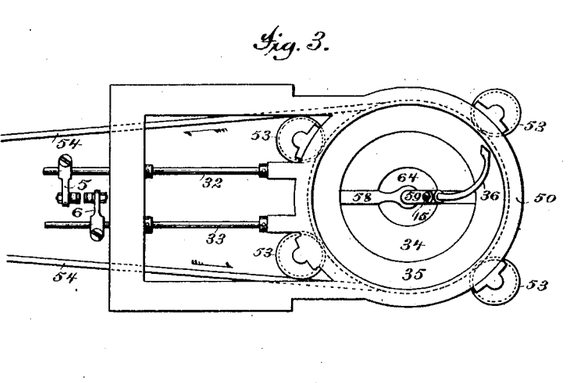
Fig. 3 is a plan view of the forward end of the apparatus, taken with the bin or hopper removed.
Figure 4:
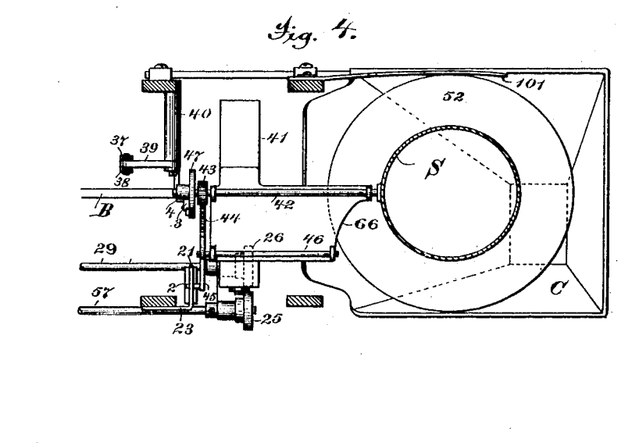
Fig. 4 is a sectional plan view of the same, cutting the apparatus horizontally through the scale-pan.

The main body of the bin or hopper A is composed of any suitable material and form, it preferably being a metallic cylinder having a conical bottom or outlet end, the opening of which coincides with the angular sides of a circular bracket, 50, that fixedly projects from the main frame-work, to which bracket the walls of the bin or hopper may be secured in any approved manner. Beneath this bracket a wheel-like carrier, 35, the opening through which is tapered, is arranged to rotate, said carrier being sustained in face-contact with the under surface of the bracket 50 by means of pulleys 53, pivoted to the bracket 50, (see Fig. 3,) between the flanges of which pulleys a rim projecting from the outer periphery of the carrier is engaged. The carrier 35 has a recessed perimeter, in which a driving band or cord, 54, runs, said band or cord extending rearwardly over a bending-pulley, 55, and passing around a driving-pulley, 56, on the driving-shaft 57, and thus causing said carrier to rotate at an appropriate speed. A conical mouth-piece, 34, the inclined or tapered inner walls of which terminate in a circular mouth, 64, depends from the carrier 35, which mouth is controlled by a suitable gate provided with means for automatically opening and closing it, as will presently appear. The carrier 35 also supports a clearer, 36, that is attached to said carrier by means of a cross-bar, 58, which clearer extends upwardly, and is curved so as to project within and near the sides of the bottom end of the bin A, and thus be rotated by said carrier to loosen up the material contained in the outlet end of the bin, where it otherwise would pack in a solid mass and become clogged and force or carry the same downward toward the mouth 64. This clearer may be adjusted more or less distant from the wall of the bin by means of its hollow holder 59, in which it is rendered adjustable by means of a set-screw, 15.

Figures 12, 13:
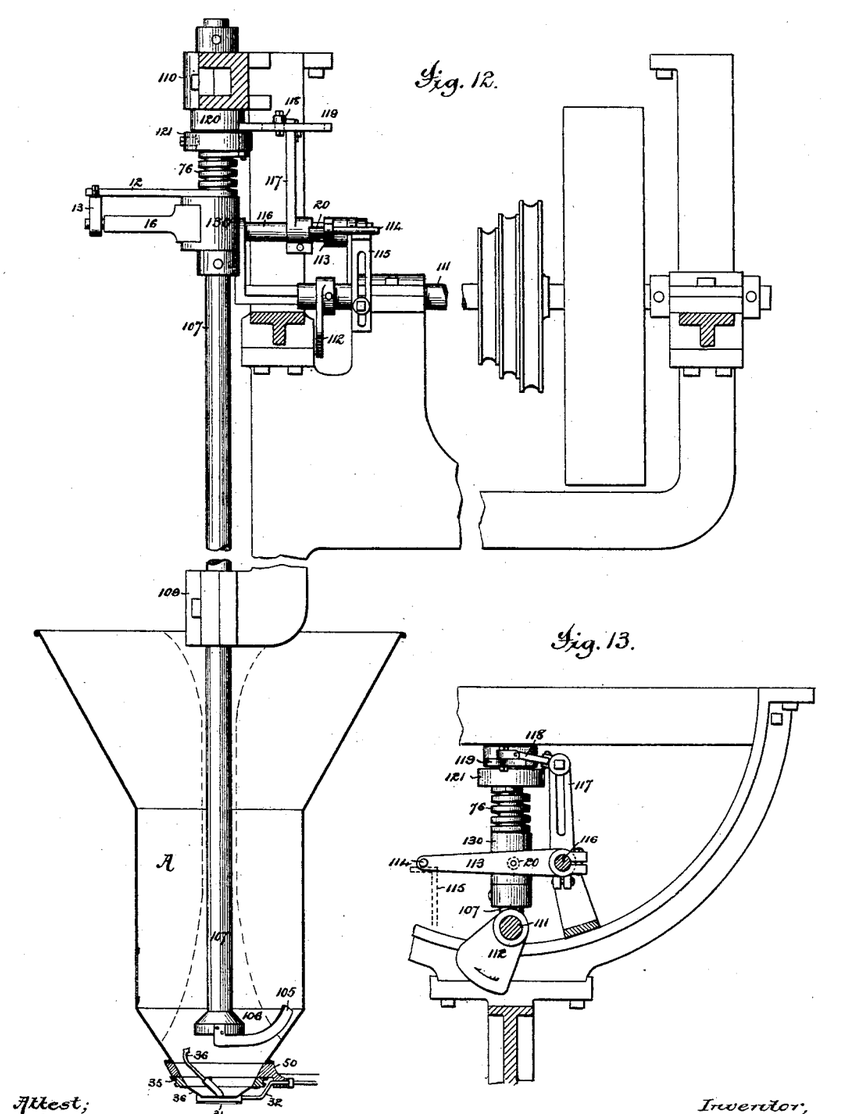
Fig. 12 illustrates the stirring apparatus with which the bin or hopper is provided.
Fig. 13 illustrates portion of the mechanisms connected with the stirring apparatus, the view being taken at right angles to that of Fig. 12.

Some materials, owing to their peculiar qualities, will frequently, in being removed from the mouth of a bin, so pack together as to line the sides of the bin and form a self-sustained circular mass with a longitudinal cavity extending from the mouth upward, and practically this has been found the case with tobacco, which substance this mechanism is particularly designed to operate upon. This condition will also occur even when the clearer 36 is provided to aid the passage of the contents through the mouth 64, so that while said clearer will move the lowermost portion of the contents of the bin the discharged material will frequently descend from the center of the mass, and thus, removing a core or central portion, leave a circular body adhering to the bin sides. As the support of this circular body starts at the bin sides and gradually extends inward toward the center, as represented by dotted lines, Fig. 12, it is apparent that its extreme lower point is a necessary part of its foundation, which, if removed, will cause the suspended mass to move downward. To effect this movement I have provided a stirrer, 105, which is a curved arm (having, if desired, an inclined side somewhat resembling a plow-share) projecting from a conical foot-piece, 106, of a shaft, 107, that is suspended vertically in the bin or hopper A, and is journaled in bearings, as 109 110, so that it may be revolved. When this shaft 107 is revolved it carries the stirrer into the lower end of the mass of suspended material and undermines and agitates the same, so that it will properly descend in the hopper, which movement, if unobstructed, would cause the material, especially when the quantity in the hopper is great, to press with a force equal to the weight of the mass upon and around the clearer 36, and thus suspend or injuriously modify its action. The conical foot-piece 106 is therefore provided to overlie the space in which said clearer works, so as to take up the greater portion of the downward pressure of the material in the hopper and so deflect it laterally as to cause it to flow sidewise into the range of action of the clearer, rather than to descend vertically upon it, thus relieving the clearer from the direct pressure of the material. It has also been discovered that if this stirrer is revolved with a regular speed it will, when the material properly descends in the bin and through its mouth, so churn the same as to injure its condition. It therefore is requisite that said stirrer shall move only when the condition of the material requires it, and when the material is properly feeding the movement of the stirrer shall cease or be modified to suit such condition. Its driving mechanism is therefore of peculiar construction, as follows: Its motive power is derived from a constantly-rotated pulley-shaft, 111. This shaft carries a cam, 112, which at each revolution engages the stud 20 of a rock-arm, 113, that normally rests by its pin 114 upon a support, 115. This rock-arm is fast to a shaft, 116, that carries another rock-arm, 117, which is connected by a link, 118, with a lever, 119, the hub 120 of which turns freely upon the shaft 107. Secured to the neck of this hub 120 is an adjustable collar, 121, to which one end of a spiral spring that encircles the shaft 107 is secured by means of a pin. The other end of this spring 76 is prolonged as a lever, 12, and is seated against the upright arm 13 of clutch-lever 16, that is pivoted in a bearing-block, 130, so as to bear upon the sliding bearing-block 93, (see detached view, Fig. 13,) said lever 16 being provided with a spring to induce its movement in the opposite direction, which spring is preferably attached to the lever by a collar, so as to be adjusted to any position thereon as may be required to insure perfect action of the spring. It is manifest from the construction of these parts that at each revolution of the shaft 111 the lever 113 will be vibrated and its motion transmitted, so as to produce a rotary movement of the spring 76, which spring will, in turn, cause the cam end of the lever 16 to press the bearing-block 93 upon the shaft 107 and clutch the same, so that said shaft will be rotated if the resistance it offers is less than the power of the spring 76. This resistance is determined by the amount of friction exerted by the pressure of the material contained in the bin upon the shaft 107, its conical head 106, and the stirrer 105. Thus, when the bin is full and said material is feeding regularly downward, its bulk will of course envelop the shaft, its head, and stirrer, and as the resistance thus offered is greater than the power of the spring 76, it is obvious that the movement of the lever 119 will be taken up wholly by said spring, and the stirrer 105 remain stationary at a time when its movement would be injurious to the tobacco and effect no useful purpose; but when, during the downward feed of the material, its body packs in the bin, so as to retard or suspend its downward movement, the pressure of the material upon the shaft 107 and stirrer 105 will be so far reduced as to make the resistance it offers less than the power of the spring, whereupon a movement of the stirrer will ensue, and an agitation of the material result sufficient to cause its downward feed, as before explained.

To prevent backlash of the shaft 107, and its tendency, from repetitions of such movement, to pack the material at one point, and thus form a body capable of resisting the power of the spring 76, said shaft may be provided with a ratchet-wheel, with which a pawl fixed to the frame is arranged to operate, and thus prevent such backlash. Thus the action of the stirrer 105 is controlled by the feeding movement of the material, and said stirrer is set in motion only at such times as its operation is required.

Figure 1:
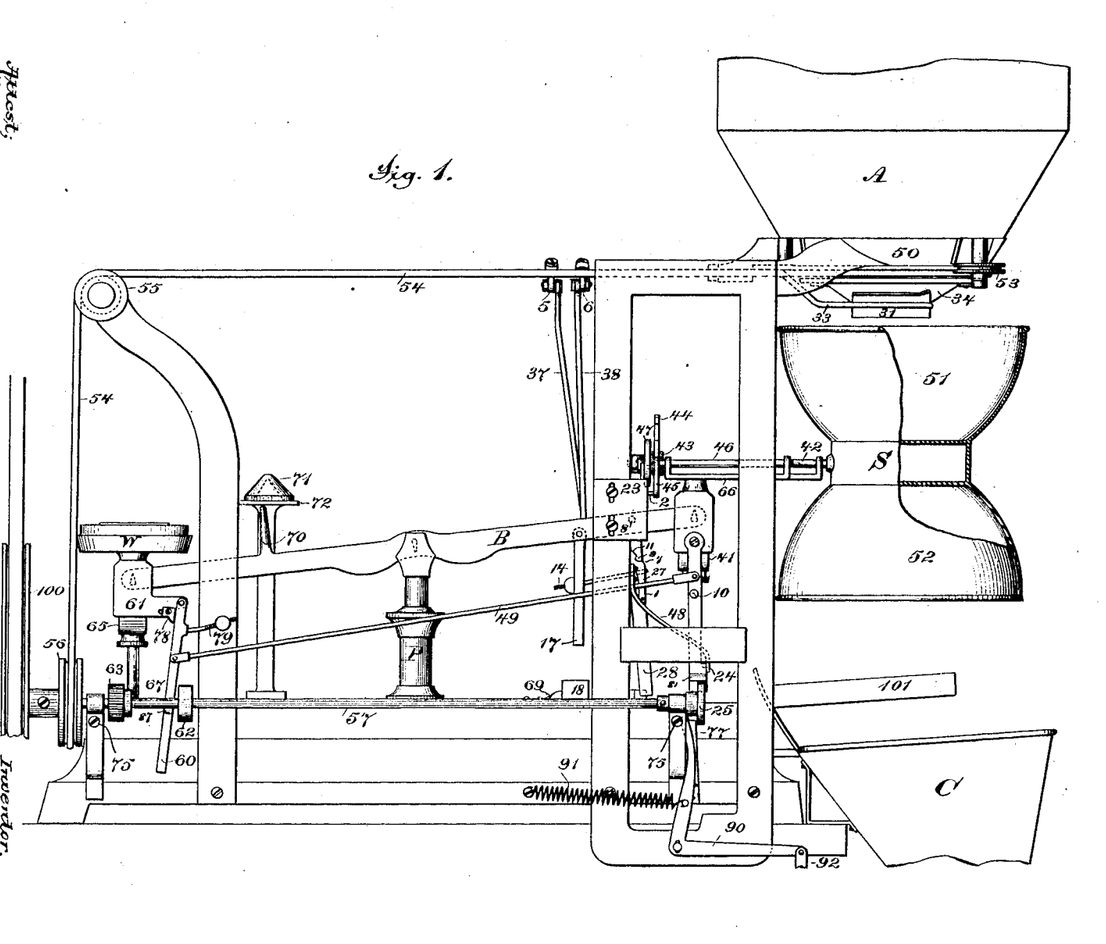
Figure 1 represents a side elevation of an apparatus embodying the same.
Figure 2:
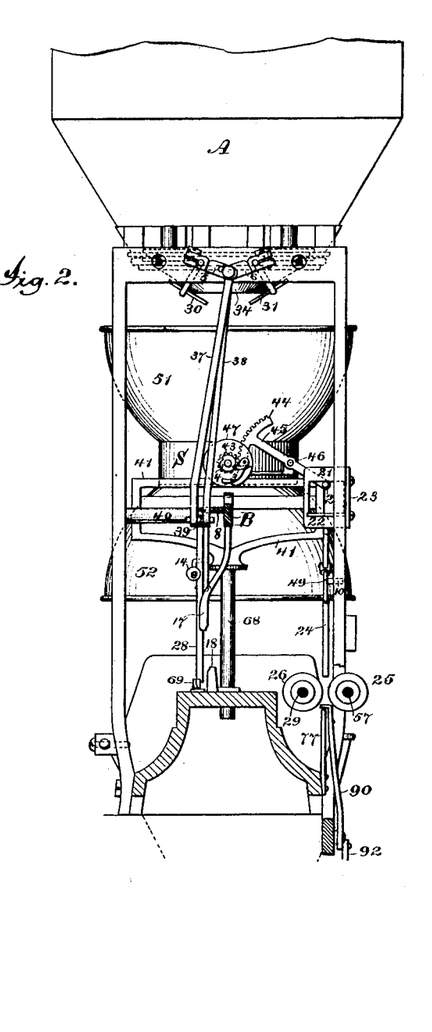
Fig. 2 is a rear elevation, cutting the apparatus about midway and looking toward the scale-pan.
Figures 5, 10, 11:
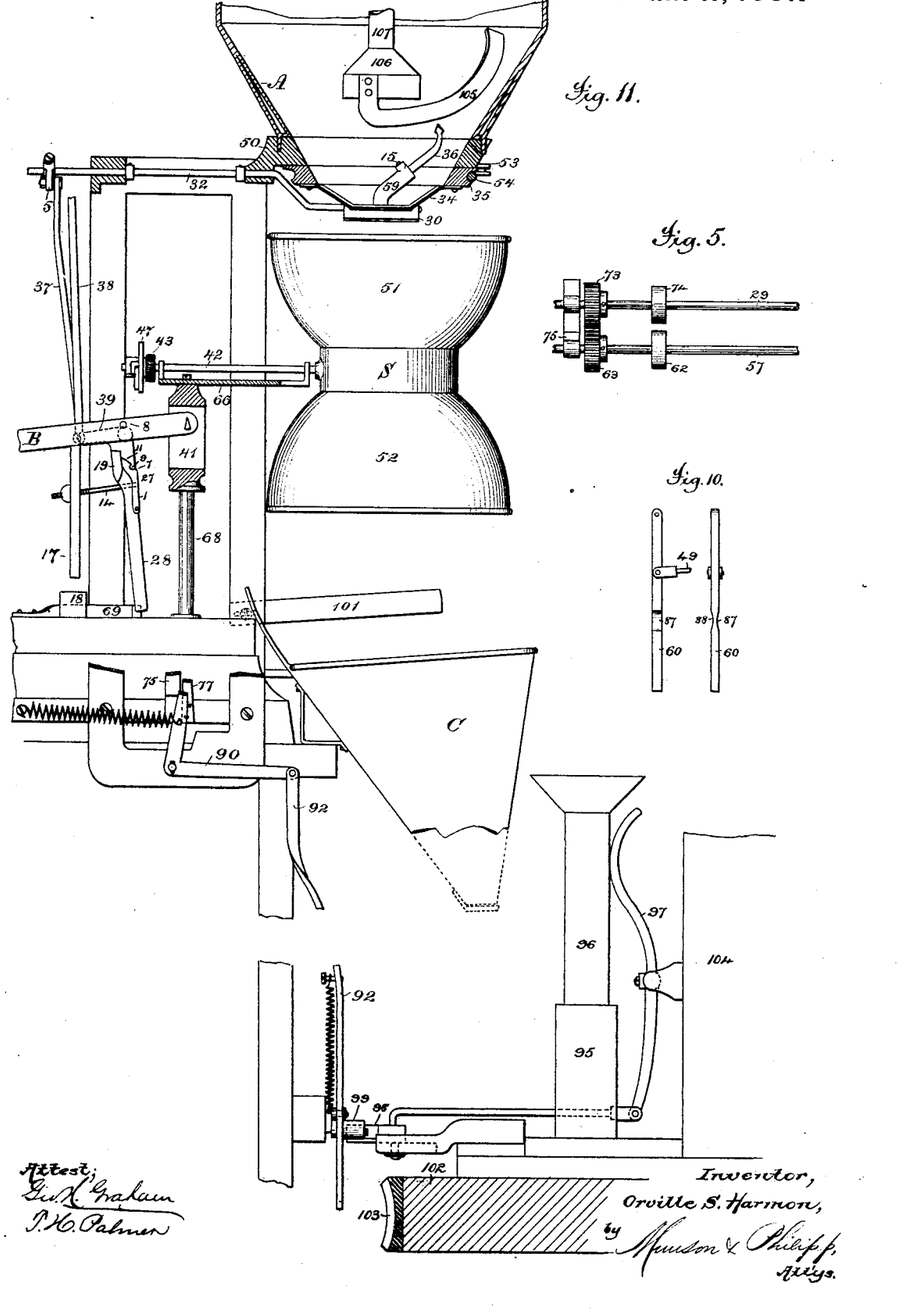
Fig. 5 is a plan view cutting the apparatus so as to simply show the driven end of its longitudinal shafts.
Fig. 10 shows face and edge views of the driving-bar 60.
Fig. 11 shows a side elevation of the forward portion of the apparatus, and illustrates its combination with a packing mechanism.

The gate controlling the mouth 64 of the bin is composed of two members, 30 31, which are carried at the ends of rods 32 33, that turn freely in the frame-work, and whose forward depending ends are bent, as shown in Figs. 1 and 11, to form cranks that sustain the members 30 31 of said gate in the position shown in Fig. 2, or carry the same toward each other until their inner edges meet centrally beneath the conical mouth-piece 34 to cover and close the mouth 64. The oscillations of these rods 32 33, necessary to produce this action of the gate, are imparted by means of rock-arms 5 6, with which they are respectively provided, which rock-arms have connecting-rods 37 38, that are coupled by a common pivot to a bell-crank whose arm 39 is pivoted on a stud, 40, that projects from the side frame. This bell-crank and its accessories form the controlling mechanism through which the scale-beam B, whose initial descent is caused by the weight of contents deposited from the bin or hopper into the scale-pan, acts first to limit and finally to suspend such deposit by partially and then wholly closing the bin-gate, whereby the egress of the material is controlled, as will hereinafter appear. The depending arm 28 of this bell-crank is provided with a pivoted pawl, 27, which is normally held rearward against a stop, 19, on the arm 28, by means of a weighted rod, 14, but readily moves forward to admit the passage between its rear face and the stop 19 of a pin, 8, projecting from one side of the scale-beam B, when said beam ascends, which said pin engages with the inclined face 11 on the head of said pawl 27, when the initial descent of the beam B takes place, and thus forces the arm 28 rearward. As this arm thus moves rearward it operates the cranked rods 32 33 to nearly close the gates 30 31, and its lower end will be forced past the laterally-operating spring-catch 69, so that the pin 8 will be in a position to play freely in the opening 9 of the pawl 27 over the inclined neck 7 thereof. (See Fig. 6.) This initial movement also causes the lifting-rod 70, projecting upward from the rear end of the beam B, to pick up the auxiliary weight 71 from the supporting-platform 72, and add its quantum of force to that of the main weight upon the platform W. When the resistance of this weight 71 is overcome a further or second downward movement of the forward end of the beam B ensues, and the pin 8, then engaging with and passing the inclined neck 7 of the arm 28, forces the same quickly rearward to further operate the rods 32 33, and completely close the mouth of the bin, said pin thereafter moving over the breast 1 of the arm 28 without further moving the same. In this second downward movement of the scale-beam B a swinging rod, 17, pivoted to depend from the scale-beam, is brought down between the face of a bearing-block, 18, and the shank of the catch 69, to wedge the catch laterally, and thus free the arm 28 to admit its forward vibration, which takes place after the pin 8 has passed off the breast of the pawl 27, the operation and purpose of which movements will more fully hereinafter appear.

The weighing mechanism proper consists of a scale-beam, B, suitably hung, by means of knife-edged pivots, upon a central post, P. This beam has pivoted upon its rear end the usual weight-receiving platform W, which is supported by a cradle, 65, hung thereon by pivoted bearings and provided with a depending guide, 67, as is common. At the forward end of this beam similar pivotal bearings support a cradle, 41, by which the scale-pan S and its accessories are carried, a depending guide, 68, governing their true vertical descent.

In upright arms projecting from a plate, 66, supported by the cradle 41, a shaft, 42, that is aligned with the scale-beam B, is arranged to rotate. This shaft 42 has the scale-pan S secured to its forward end, and at its rear end carries a rigidly-secured ratchet-wheel, 4. It also supports a pinion, 43, that is attached to the face of a disk, 47, that supports a spring-seated pawl, 3, said pinion and disk being arranged to turn freely upon the shaft in one direction, and to be locked thereto by means of the pawl and ratchet when this shaft turns in the opposite direction. This pinion 43 is engaged by a segment-rack, 44, that is carried at the forward end of a lever, 45, which is pivoted upon a short shaft, 46, journaled in ears projecting from the plate 66. The rear end of this lever 45 is provided with a laterally-projecting stud, 2, that plays within a recess, the limits of which are fixed by the arms 21 22 of a plate, 23, fastened to the side frame and adjustable vertically thereon by means of set-screws, as shown in Fig. 1.

The positive descent of the scale-pan and its accessories and its delivery action are accomplished after its initial descent is performed by the gravity of the contents delivered to it through the following means:

The cradle 41 carries at one side a pivoted propelling or driving bar, 24, which is adapted to be engaged between a pair of driving clutch-wheels, 25 26, carried respectively by the main shaft 57 and a companion parallel shaft, 29. These shafts are driven in unison by means of pinions 63 73, the shaft 57 being set in motion by a belt-pulley, as 100, or otherwise, as is common. This shaft 57 is provided at each end with adjusting-screws, as 75, whereby its bearings may be nicely adjusted so as to move the clutch-wheels it carries into proper relation with their companions to perfectly operate upon the bar 24 and the arm 60, and compensate for any wear of the engaging-surfaces that may ensue. The driving-bar 24 depends so that its lower end may stand within the range of action of the driving clutch-wheels 25 26, and it is at certain periods pressed rearward by means of a spring, 48, projecting from the side frame, and held normally in the position shown in Fig. 1 by means of a weighted arm, 79, projecting from the companion propelling-arm 60, with which it is connected by a rod, 49, which arm 60 is pivoted to the cradle 61, supporting the weight-platform W. This arm 60 depends so as to be within the range of action of, and so as to be operated by, driving clutch-wheels 62 74, (see Fig. 5,) in manner similar to the operation of the arm 24, as will be presently explained.

Figure 6:
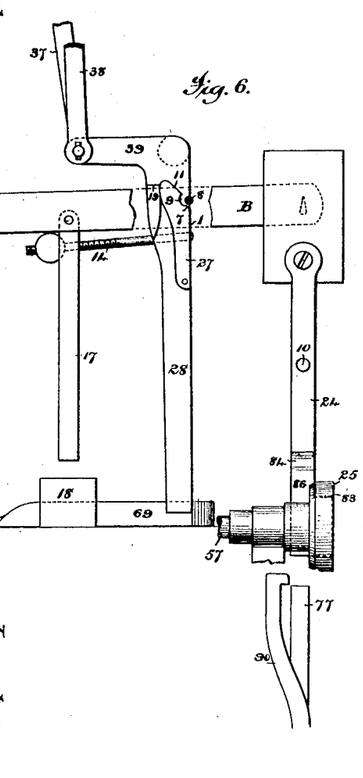
Fig. 6 shows an enlarged side elevation of one form of the mechanism for actuating the devices controlling the flow of material from the bin or hopper.
Figure 7:
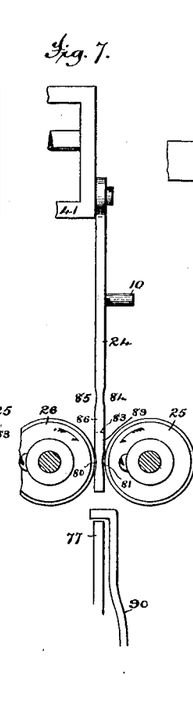
Fig 7 is an edge view, more particularly illustrating the structure of the driving-bar 24.

The driving-bar 24 is of peculiar construction, as is shown in Figs. 6 and 7. Its body is cut away on opposite sides near its lower end, as at 80 81, so that when that part of it is embraced by the wheels 25 26 they will not clutch upon its surface, and therefore impart no movement to it. It is constructed in the form of a narrow shank, 86, the lower end of which is enlarged, as at 82, to provide a wide bearing for co-operation with the wheels 25 26, so that when it has so far descended between the wheels 25 26 that the edge 83 of its enlargement has passed the adjacent points of their peripheries, the clutching action of the wheels upon it will cease and the downward feeding movement of it be suspended. It is, furthermore, cut away to provide recesses, as at 84 85, so that when that part of its body is between said wheels they will revolve without acting upon it. The arm 60 is cut away to provide recesses 87 88, (see Fig. 10,) to suspend the driving action of the wheels 62 74 upon it in a similar manner. When this bar 24 and arm 60 stand as is shown in Fig. 1 they are disengaged from the clutch-wheels, though the lower end of the bar 24 stands between the wheels 25 26, but high enough not to be clutched by them, and yet so as to operate as will be presently explained.

A tripping mechanism for setting in operation the means for causing the dumping operation of the scale-pan and of restoring the parts to again perform the weighing operation, is constructed as follows:

A shipping-lever, 90, of bell-crank form, has one arm extended to lie behind the bar 24, where it is held by a spring, 91. Its other arm is provided with a connecting-rod, 92, that is automatically moved in a manner that will be described farther on. At proper times, when the bell-crank 90 is rocked forward, it thrusts the end of the lever 24 outward so as to engage its shank 86 between the wheels 25 26, the edges of which are beveled to permit such movement, and which, constantly revolving, clutch the said bar 24 and positively draw it downward, thus depressing the forward end of the scale-beam B. As this bar 24 descends to thus draw down the scale-beam a pin, 10, on its body engages the end of the curved spring 48, thus pressing it rearwardly, and when said arm has completed its movement between the wheels 25 26, and is released therefrom by the arrival of the cut-away portions 84 85, said spring 48, by its resiliency, quickly vibrates the bar 24 forward, thus throwing it from between the wheels 25 26, and, through the rod 49, drawing the arm 60 (then raised) in like manner forward to enter its lower end between the wheels 62 74, which, constantly revolving, clutch the rod 60, and, drawing it downward, vibrate the scale-beam B in a contrary direction, so as to carry the scale-pan up to the position in which it receives the charge of material to be measured, and returns the other parts to their normal positions. When the recessed parts 87 88 of the arm 60 arrive between the wheels 62 74 said arm is thrown rearwardly by the action of the weighted counterbalancing-arm 79 to the position shown in Fig. 1, thus carrying the end of the bar 24 between the wheels 25 26, where it stands, as before explained, ready to be engaged by said wheels; and to govern this position of the bar 24 accurately an adjustable gage, 78, is provided upon the plate 61, to which said arm 60 is pivoted.

Operation: The shafts 57, 29, and 111 are set in revolution by the driving mechanism, thereby rotating the mouth-piece 34, as well as clearer 36 and the stirrer 105, whereby the material contained in the bin is agitated and stirred up so as to cause it to move regularly downward in the bin and be directed in a light loose body toward the mouth 64. During the period of time in which the tobacco is being fed within the scale-pan to be weighed the parts stand as shown in Fig. 1, the arm 28 being held in its forward position shown, and thus holding the gates 30 31 open by the action of the weight of the rock-arm of which it is a part, or it might be by means of a spring of suitable power. When the bulk of material to be weighed, or a sufficient quantity thereof, has been deposited in the uppermost receptacle, as 51, of the scale-pan it will counterbalance and overcome the weight upon the platform W, and the body of material thus accumulated in the scale-pan will therefore cause the same to descend. In thus descending all of the parts attached to the cradle 41 move in a like manner downward, and the following results take place: The bar 24 moves downward far enough to have its lower end, 82, engaged with the wheels 25 26, which, clutching it, act to draw it down positively until its recessed portions 80 81 are reached, when the action of the wheels upon the bar 24 ceases. During this descent the arm 28, forcibly carried rearward by the pin 8 on the scale-beam, engages with and moves over the inclined face of the head 11 of the pawl 27, said stud thus pressing the arm 28 powerfully enough, under the driving-action of the wheels 25 26 upon the bar 24, to raise the rods 37 38, vibrate the rock-arms 5 6 to turn the crank-rods 32 33, and quickly move the gates 30 31 toward each other, or centrally, and thus so far close the mouth 64 of the bin as to shut off the bulk of the flowing stream of material, or so diminish the same that but a small quantity will sift out of said mouth under the action of the clearer 36. This rearward movement of the arm 28 causes its lower end to pass the end of the spring-catch 69, which springs before it, and thus locks said arm 28 in its rearward position, and retains it there until it is released in proper time to admit its upward movement. As this descending movement of the parts takes place the rising end of the scale-beam picks up the auxiliary weight 71, and thus supplies to the scale-beam an additional resistance to be overcome. This weight 71 is provided to enable the exact quantity of the material to be accurately measured, and, added to the main weight on the platform W, represents the whole quantity to be weighed. As its weight is slight and the stream of material now flowing from the bin is small, it is apparent that an exact balancing of the scale-beam may be accomplished, since at this time the scale-beam is free to play, by reason of the stud 8 being opposite to the opening 9, in the pawl 27, and the removed parts 80 81 of the bar 24 are embraced by the wheels 25 26. When the scale-beam then makes a further descent the part 89 of the bar 24 is quickly clutched between the wheels 25 26, and the positive downward movement of the scale-beam and the parts it carries is resumed. The stud 8 immediately engages the inclined neck 7 of the pawl 27, thus quickly throwing the arm 28 rearwardly to a slight degree and operating the gates 30 31 so as to completely close the mouth of the bin and entirely stop the flow of material therefrom, the stud 8 then passing freely down the breast 1 of said pawl, and the stud 2 on the segment-lever 45 traveling from the stop-arm 21 toward the stop-arm 22. When the bar 24 has so far descended between the wheels 25 26 that they have passed off its edge 83, and its bottom end engages a rest or stop, 77, its downward movement will cease, and the various parts of the weighing mechanism remain at rest, the scale-pan holding a measured quantity of material.

If, now, it is desired to dump the contents of the scale-pan, the forward motion of the shipping-lever or bell-crank 90 will throw the bar 24 forward, so that its shank 86 will be entered between the wheels 25 26, whereupon said bar 24 will again be clamped by said wheels and positively drawn downward. In this renewed descending movement the stud 2 on the segment-lever 45 is arrested by the stop 22, (the scale-pan then being in a low position over the conveying-chute C,) and said segment is thereby rocked, thus causing the pinion 43 and the disk 47 to revolve, the pawl 3 of which disk, then engaging one tooth of the ratchet-wheel 4, couples the shaft 46 to said pinion, and thereby forces said shaft to make a half-revolution, and with it the scale-pan S, thus turning its uppermost receptacle, 51, or that one containing the measured material, downward, dumping said material into the mouth end of the conveying-chute C, which may convey it onto a table or into any suitable receptacle. The turning or dumping movement of the scale-pan is limited by a half-revolution of the shaft 46; but in order to prevent its greater throw a stop, 101, is arranged to project from one side frame and suspend its movement at the end of a half-revolution, whereby no disturbance of the relative arrangement of the operative parts may result. The dumping movement of the scale-pan is accomplished during this last-described downward movement of the mechanisms, and is, of course, complete when the descending movement of the bar 24 has brought the recesses 84 85 of its shank 86 within the embrace of the wheels 25 26, when it is free, and may be disengaged from said wheels. As the scale-beam thus last descends its swinging depending rod 17 is entered between the face of the bearing-block 18 and the shank of the catch 69, and thus forces the latter so far back as to free the arm 28. This is accomplished at the moment when the recesses 84 85 of the bar 24 are entered between the wheels 25 26, and whereupon the pressure of the spring 48 upon the pin 10 throws said bar 24 forward and moves the arm 60 in like manner, thus entering it into the clutch of the wheels 62 74, which operate to positively draw down the weighted end of the scale-beam and raise the scale-pan S to its highest position; and when the recesses 87 88 of this arm 60 have been reached said arm, then set free, is thrown rearwardly out of the embrace of the wheels 62 74 by the weighted arm 79, and thus restores the rearward position of the bar 24 over the wheels 25 26. When the arm 28 is set free it quickly moves forward to operate the crank-rods 32 33 and widely open the mouth 64 of the bin A, from which a large stream of material flows into the receptacle 52 of the scale-pan S, which is now uppermost. During the rising movement of the scale-pan the pin 8 on the scale-beam is carried over the rear face of the pawl 27, which moves forward to allow it to pass upward to its higher position above it, and the stud 2, striking the stop 21, causes the segment-lever to be arrested and to so far idly rotate the pinion 43 as to reach the position shown in Figs. 1 2, in which all the parts are in position to repeat the operation.

Figure 8:
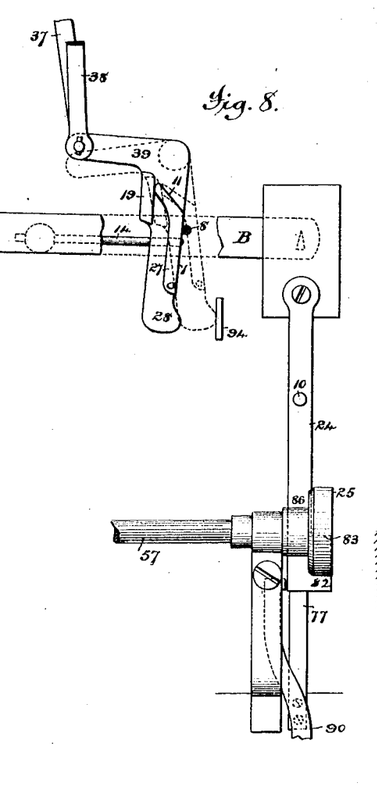
Fig. 8 shows an enlarged side elevation of a modified form of the mechanism actuating the devices controlling the flow of material from the bin or hopper.
Figure 9:
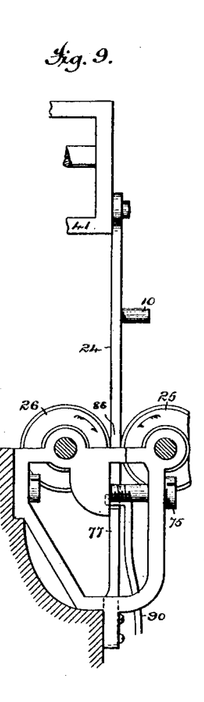
Fig. 9 is an edge view, more particularly illustrating the structure of the modified form of the driving-bar 24.

The construction thus far described is that of an apparatus designed to weigh costly materials, or such as require great accuracy in their measurement; but for cheaper materials, or such as do not require great accuracy, considerable modification may be made. Thus the adjusting-weight 71, its table 72, and lifting-arm 70 may be dispensed with, as may be the swinging rod 17, bearing-block 18, and spring-catch 64. The gate-operating mechanism may then have the modified construction shown in Fig. 8. The arm 28 of the rock-arm is bent so as to engage a stop, 94, when said rock-arm is vibrated forward to cause the mouth 64 to be uncovered, and its pawl 27 has simply an inclined head, as 11, that terminates in its breast 1. The propelling-arm 24 has the recesses 80 81 omitted, and its removed part 82 has a greater length. The operation will, when these modified devices are used, vary from that heretofore described in the omission of the intermediate stopping of the scale-beam between its initial descent and its final or dumping movement. Thus, when the quantity of material received in the scale-pan is sufficient to overcome the weight on the platform W, and thus cause the scale-pan to perform its initial descent, the stud 8 on the scale-beam, engaging and passing over the inclined face of the head 11, will vibrate the arm 28 of the bell-crank so far as to completely close the gates 30 31 over the mouth 64 of the bin, thus completely shutting off the flow of the material into the scale-pan. This initial movement enters the end of the bar 24 between the wheels 25 26, which, clutching said arm, draw it down until its part 89 is passed and its edge 83 is below the centers of said wheels, when said bar 24 rests upon the stop 77, and the parts are arrested, as is illustrated in Fig. 8. In this position the final or dumping operation will be performed precisely as before explained, by tripping the shipping-lever 90.

It will thus be observed that when the parts are in their highest or normal position, which is that in which they stand to receive the material to be measured, the scale-beam is free to move in the balancing or weighing operation, its scale-pan being held upward by the resistance offered by the weights upon its opposite end, so that as soon as this resistance is overcome by the material admitted into the scale-pan the vibration of the scale-beam will ensue, and the operations be performed as has been described.

The shipping-lever 90 may be operated by hand, if desired, and the contents of the scale-pan, dumped into the conveying-chute C, may be delivered therefrom onto a table or other receptacle, and be disposed of by hand operations.

In order that this measuring apparatus may be more advantageously employed than would be the case if the measured portions it produces depend wholly upon hand manipulation for their disposal, I have combined it with a packing apparatus that consists, essentially, of a revolving table, 102, that is provided with a series of packing devices. One only of such packers is here shown in Fig. 11, which illustrates the coaction of my apparatus with such a packing apparatus. This table 102 will be rotated in any common manner, as by a peripheral segment-rack, 103, driven by an engaging worm. It will be provided with a box or "former," as 95, in which the package is to be formed, into which, or the envelope, box, bag, or wrapper contained therein, the contents dumped from the scale-pan S and directed by the chute C is conveyed by means of a conducting-tube, as 96, which is adapted to enter the mouth of said former. Each packer is supplied with a lever, as 97, pivoted to a standard, 104, in such a manner that when a conducting-tube, 96, is placed in the former to make it ready to receive a charge of material to be packed it will be forced rearwardly by said tube, and thus thrust forward a tripping-arm, 98, carried by a rod that is pivoted to the lower end of said lever, which arm 98, will thereby be projected so far beyond the periphery of the table that it will, in consequence of the rotation of the table, and at the time when the conductor 96 is beneath the chute C, be brought into engagement with a stud projecting from a lever, 99, that is pivoted to the rod 92, and vibrate the same to rock the lever 90, and thus move the bar 24 between the clutch-wheels 25 26, whereby the dumping action of the scale-pan S will be accomplished and its contents emptied into the chute C, and then conveyed by the tube 96 into the former 95, to charge the same, the mouth end of said chute being provided with a thin-edged cross-bar, which breaks up the material and thus aids its uninterrupted descent. Whenever a former, 95, that is not supplied with a tube, 96, passes the point occupied by the rod 92 it will be apparent that the arm 98 will be held so far back as not to engage the stud 99, and therefore that the operation of the measuring apparatus will be suspended until a properly made ready former does so pass and cause the dumping and charging operations just described.

Even when the bar 24 and its operating mechanisms are used the bar 60 and its driving clutch-wheels may be omitted; but it is preferable to use these latter devices, since, when the full descent of the scale-pan is effected, the bar 24 is immediately disengaged from the wheels 25 26, and the force of the weight W will tend to carry the scale-pan upward so forcibly as to cause it to rebound, thereby setting the bar 24 again into engagement with the wheels 25 26, whereupon another descent will take place without regard to the quantity of material in the scale-pan. By the use of the arm 60 an upward movement, equal to the regular travel of the wheels 62 74, is compelled, and consequently no rebound will result.

From the foregoing description of the mechanisms and their operation, it will be obvious that only one gate, as 30 or 31, is requisite to control the mouth 64, and that such single gate may be oscillated or reciprocated by a simple adaptation of parts.

It is apparent that the stud 8 might project from the cradle of the scale-pan and operate effectually in performing its function, and that the recess 9, provided in the pawl 27, might be omitted, since the same is provided to insure a clearance for the stud 8, which might operate practically if the inclined head 11 and inclined neck 7 were connected by a straight line.

The bar 17 might be rigidly attached to the scale-beam and still perform its intended function.

It is also practical, in some instances, to omit the bar 24 and arm 60, and the mechanisms operating in connection with them, and depend upon the weight of material in the scale-pan when the charge is complete to cause its descent, the cutting off of the supply of material to said scale-pan, and accomplish its dumping operation.

Figure 17:
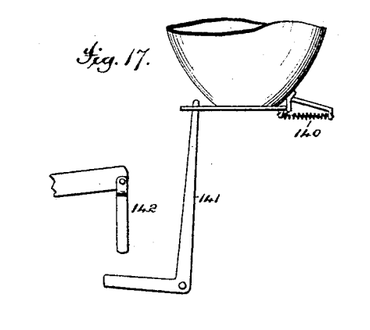
Fig. 17 shows a modified means for dumping the scale-pan.

The dumping apparatus might be made so as to cause the scale-pan to tip down and back in the dumping operation, instead of making a half-revolution, in which case but one receptacle, as 51 or 52, would be required; or, instead of a vibrating gate or gates, a sliding gate might be used, as in Fig. 17, said gate being closed by a spring, as 140, and opened by means of a bell-crank, 141, operating by a depending arm, 142, extending from either of the beams.

The tripping-lever 77 might be arranged so as to operate as a stop, upon the top of which the propelling-bar 24 might rest temporarily, and be allowed to resume its downward movement when said lever is moved from beneath it.

Figure 14:
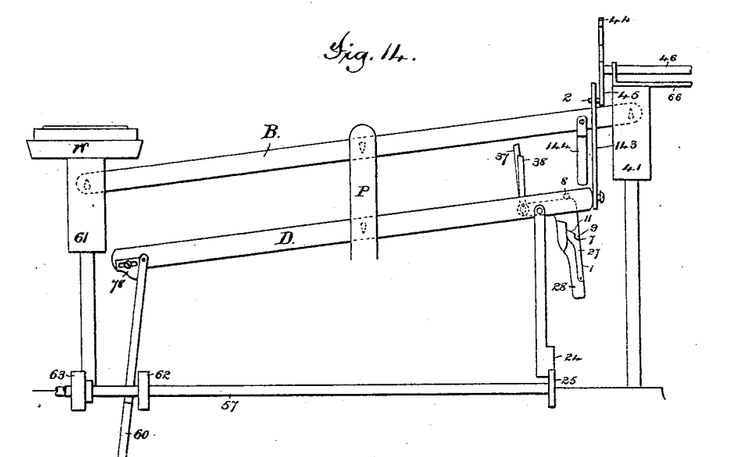
Fig. 14 shows a modification of some of the principal mechanisms.
Figure 15:
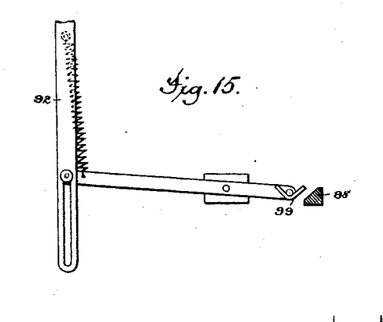
Fig. 15 shows, by a front elevation, and Fig. 16 by a sectional plan view, the shipping-lever and means for automatically tripping it.
Figure 16:
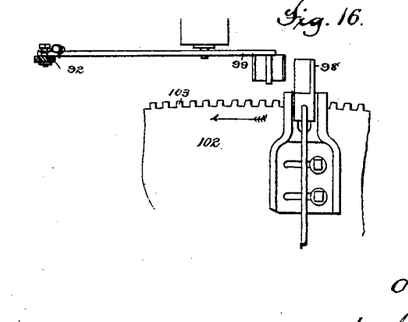

It is not essential that the bar 24 should be attached to the scale-beam, as appears by the modified arrangement shown in Fig. 14. In this instance said bar 24 depends from an auxiliary balanced beam, D, arranged to play beneath the scale-beam B, and to this beam D the bar 24 is attached, and operates in like manner as when attached to the beam B. This beam D may also carry the pin 8, whereby the arm 28 is operated, and also have attached to it a connecting-rod, 143, by the slotted form of the upper end of which the stops 21 22 are provided, which rod 143 accomplishes the dumping action of the scale-pan through the segment and pinion, as hereinbefore described.

The scale-beam B, carrying the scale-pan, has a depending rod, 144, of appropriate length, the end of which rests upon the beam D when the scale-pan is raised to receive its charge. When the scale-pan is charged, and is thus caused to descend, the beam B, through the rod 144, causes the beam D to descend, thus carrying the end of the bar 24 into the clutch of the wheels 25 26, and causing the pin 8 to operate the arm 28 and stop the flow of material. The parts then rest in that position, and the scale-beam B and scale-pan S descend no farther. When, however, the bar 24 is again set in motion by the wheels 25 26, as has been described, the auxiliary beam D is caused to vibrate downward, carrying with it the arm 143, which thus moves the segment 44 to accomplish the dumping operation.

I claim as follows:

1. The combination, with a weighing-scale and its scale-pan, of positively-acting means for discharging the contents of said scale-pan, all substantially as described.

2. The combination, with a weighing-scale and its scale-pan, of means for discharging the contents of said scale-pan, a conveying-chute, as C, and a rotating receiving-table, all substantially as described.

3. The combination, with a weighing-scale, a mouth or conduit from which flows the material to be measured, and means for controlling the flow of said material set into operation by the descent of the scale-pan, of a positively-acting mechanism for discharging the contents of said scale-pan, all substantially as described.

4. The combination, with a weighing-scale and its scale-pan, of positively-acting mechanism for dumping said scale-pan that is set into operation by the descent of the scale beam or pan, all substantially as described.

5. The combination, with a scale-pan provided with means for controlling the flow of material charging it and with mechanisms for discharging its contents, of a driving-bar, whereby the discharging mechanism is operated, all substantially as described.

6. The combination, with a scale-pan and means automatically operated to control the flow of material thereto, and with mechanism for discharging its contents, of a driving-bar constructed so that the propelling action of its driver shall cease at a required interval or intervals, all substantially as described.

7. The combination, with the ordinary weight-support of a weighing-scale, of an auxiliary weight-support, as 72, and arm 70, all substantially as described.

8. The combination, with a weighing-scale the scale-pan whereof is charged by material flowing into it, and thereby caused to overcome the main quantity-determining weight, and means automatically operated by the descending movement of the scale-pan to control the flow of such material, whereby, when the main bulk of the charge is received in the scale-pan, it will initially descend to lessen the flow of material, be suspended until the limited flow of material overcomes and raises the auxiliary weight, and then again descend to cut off the supply of material and present the charged scale-pan in a position to be discharged, of means for discharging said scale-pan, all substantially as described.

9. The combination, with a scale-pan and means automatically operated to control the flow of material thereto, and mechanism for discharging its contents, of a tripping mechanism setting said discharging mechanism into action, all substantially as described.

10. The combination, with a weighing-scale, a mouth or conduit from which the material to be measured flows, and means operated by the descent of the scale-pan to control the flow of material into it, of a driving-bar attached to the scale-pan cradle, means for propelling said bar, whereby the initial gravitation of the scale-pan is continued by a positive primary descent, a tripping mechanism for setting said driving-bar, when its movement is suspended, into action to produce a further descent of the scale-pan, and a mechanism causing said scale-pan to discharge its contents, all substantially as described.

11. The combination, with a weighing-scale having an applied and a suspended weight, a bin or hopper from which the material to be measured flows, means operated by the descent of the scale-pan to control the flow of material into it and to pick up the suspended weight, of a driving-bar attached to the scale-pan cradle and constructed so as to make three successive independent movements, means for propelling said bar, a tripping mechanism setting the bar into action when its movement is suspended, and a mechanism for dumping said scale-pan, said devices operating so that the initial gravitation of the scale-pan is converted into a positive primary descent, during which the suspended weight is applied and the flow of material is lessened, and a second gravitation of the scale-pan is made, during which the supply of material is cut off, whereupon the tripping mechanism sets the driving-bar again into action to produce a final descent of the scale-pan and cause the dumping mechanism to accomplish the swinging movement of the scale-pan whereby its measured contents are discharged, all substantially as described.

12. The combination, with a gate closing the mouth 64 and a scale-pan, of a swinging arm, as 28, and connecting devices transmitting its movement to operate said gate, and a pin operated to move said arm by the descent of the scale-pan, all substantially as described.

13. The combination, with a scale-pan, a gate controlling the mouth 64, a swinging arm having a pawl, 27, with inclined head, and connecting devices transmitting the movement of said arm to the gate to operate the same, of a pin moved by the descent of the scale-pan to actuate said arm, and a driving-arm, as 24, and wheels, as 25 26, for propelling said arm, substantially as described.

14. The combination, with a weighing-scale and its scale-pan, with means for charging said scale-pan with material to be weighed, of a driving-arm, as 24, having a projection, as 89, and propelled by wheels, all substantially as described.

15. The combination, with a scale-pan, of a gate controlling the mouth 64, a swinging arm having a pawl, 27, with inclined head, and connecting devices transmitting the movement of said arm to the gate to operate the same, a pin moved by the descent of the scale-pan to actuate said arm, a driving-arm, as 24, having a projection, as 89, and propelling-wheels 25 26, substantially as described.

16. The combination, with a scale-pan, of a gate controlling the mouth 64, a swinging arm having a pawl, 27, with inclined head, and connecting devices transmitting the movement of said arm to the gate, a pin moved by the descent of the scale-pan to actuate said arm, a driving-arm, as 24, having a projection, as 89, and removed parts 80 81, and propelling-wheels 25 26, substantially as described.

17. The combination, with a weighing-scale, its scale-pan, and means for charging the same with material to be weighed, of a driving-bar, as 24, and stop, as 77, substantially as described.

18. The combination, with a weighing-scale, its scale-pan, and means for discharging the contents thereof, of a driving-bar, as 24, and stop, as 77, substantially as described.

19. The combination, with a scale-pan, of a gate controlling the mouth 64, a swinging arm having a pawl, 27, with inclined head, and connecting devices transmitting the movement of said arm to the gate, a pin moved by the descent of the scale-pan to actuate said arm, a driving-arm, as 24, propelling-wheels 25 26, and stop 77, substantially as described.

20. The combination of a weighing-scale, its pan, a gate controlling the mouth of the material-supplying hopper, connecting devices transmitting the movement of an arm to the controlling-gate, and a pin moved by the descent of the scale-pan to actuate said arm, all substantially as described.

21. The combination, with the scale-pan of a weighing-scale and a gate controlling the mouth of a material-supplying hopper, of an arm having a pawl, 27, with inclined head, connecting devices transmitting the movement of said arm to the controlling-gate, and a pin moved by the descent of the scale-pan to actuate said arm, all substantially as described.

22. The combination, with a scale-pan, of a gate controlling the mouth 64, a swinging arm having a pawl, 27, with inclined head, and connecting devices transmitting the movement of said arm to the gate, a pin moved by the descent of the scale-pan to actuate said arm, and a stop, as 94, limiting its forward movement, substantially as described.

23. The combination, with a scale-pan, of a gate controlling the mouth 64, a swinging arm having a pawl, 27, with inclined head, and connecting devices transmitting the movement of said arm to the gate, a pin moved by the descent of the scale-pan to actuate said arm, a driving arm, as 24, wheels 25 26, and tripping-lever, as 90, substantially as described.

24. The combination, with a scale-pan, of a gate controlling the mouth 64, a swinging arm having a pawl, 27, with inclined head, and connecting devices transmitting the movement of said arm to the gate, a pin moved by the descent of the scale-pan to actuate said arm, a driving-arm, as 24, having recesses, as 84 85, propelling-wheels 25 26, pin 10, and spring 48, substantially as described.

25. The combination, with a scale-pan, of a gate controlling the mouth 64, a swinging arm having a pawl, 27, with inclined head, and connecting devices transmitting the movement of said arm to the gate, a pin moved by the descent of the scale-pan to actuate said arm, a driving-arm, as 24, wheels 25 26, a driving-arm, as 60, and wheels 62 74, substantially as described.

26. The combination, with a scale-pan, of a gate controlling the mouth 64, a swinging arm having a pawl, 27, with inclined head, and connecting devices transmitting the movement of said arm to the gate, a pin moved by the descent of the scale-pan to actuate said arm, a driving-arm, 24, wheels 25 26, and a catch-lever, 69, substantially as described.

27. The combination, with a scale-pan, of a gate controlling the mouth 64, a swinging arm having a pawl, 27, with inclined head, and connecting devices transmitting the movement of said arm to the gate, a pin moved by the descent of the scale-pan to actuate said arm, a driving-arm, 24, wheels 25 26, catch-lever 69, rod 17, and block 18, substantially as described.

28. The combination, with a gate controlling the mouth 64, of a swinging arm having a pawl with inclined head, and connecting devices transmitting the movements of said arm to the gate to operate the same, a pin moved by the descent of the scale-pan to actuate said arm, a scale-pan capable of swinging upon a shaft, as 42, a pinion, as 43, and means for coupling it to said shaft, a rocking segment, as 44, a stop, as 22, and a driving-arm, as 24, and propelling-wheels, as 25 26, substantially as described.

29. The combination, with a gate controlling the mouth 64, of a swinging arm having a pawl with inclined head, and connecting devices transmitting the movements of said arm to the gate to operate the same, a pin moved by the descent of the scale-pan to actuate said arm, a scale-pan capable of swinging upon a shaft, as 42, a pinion, as 43, and means for coupling it to said shaft, a rocking segment, as 44, stops 22 21, bar 101, and a driving-arm, as 24, and propelling-wheels, as 25 26, substantially as described.

30. The combination, with a scale-pan, of a gate controlling the mouth 64, a swinging arm, as 28, having a pawl, 27, with inclined head 11, neck 7, and connecting devices transmitting the movements of said arm to the gate to operate the same, a pin moved by the descent of the scale-pan to actuate said arm, and a driving-bar, 24, having projection 89, recesses 80 81, an edge, 83, and a shank, 86, recessed at 84 85, with propelling-wheels 25 26, substantially as described.

31. The combination, with a scale-pan, of a gate controlling the mouth 64, a swinging arm, as 28, having a pawl, 27, with inclined head 11, neck 7, and connecting devices transmitting the movements of said arm to the gate to operate the same, a pin moved by the descent of the scale-pan to actuate said arm, an arm, 70, raised thereby to pick up the suspended weight 71, and a driving-bar, 24, having projection 89, removed parts 80 81, an edge, 83, and a shank, 86, recessed at 84 85, with propelling-wheels 25 26, substantially as described.

32. The combination, with a scale-pan, of a gate controlling the mouth 64, a swinging arm, as 28, having a pawl, 27, with inclined head 11, neck 7, and connecting devices transmitting the movements of said arm to the gate to operate the same, a pin moved by the descent of the scale-pan to actuate said arm, an arm, 70, raised thereby to pick up the suspended weight 71, rod 17, latch 69, block 18, and a driving-bar, 24, having projection 89, removed parts 80 81, an edge, 83, and a shank, 86, recessed at 84 85, with propelling-wheels 25 26, substantially as described.

33. The combination, with a weighing-scale, its scale-pan, and a feeding-hopper, of the rotating clearer 36, substantially as described.

34. The combination, with a weighing-scale, its scale-pan, and a feeding-hopper, of the rotating clearer 36 and rotating stirrer, 105, substantially as described.

35. The combination, with a weighing-scale and its scale-pan, of the rotating mouth-piece 34 and a gate automatically operated to control the mouth 64, substantially as described.

36. The combination, with a weighing-scale and its scale-pan, of the mouth-piece 34, rotating clearer 36, and a gate automatically operated to control the mouth 64, substantially as described.

37. The combination, with a weighing-scale and its scale-pan, of the mouth-piece 34, rotating clearer 36, rotating stirrer 105, and a gate automatically operated to control the mouth 64, substantially as described.

38. The combination, with the hopper, its supporting-frame, and the pulleys 53, of the rotating mouth-piece having a peripheral flange, whereby it is guided by said pulleys while turning, substantially as described.

39. The combination, with the scale-pan and its cradle, of a shaft, 42, and means for rocking said shaft intermittingly, substantially as described.

40. The combination, with the scale-pan, its cradle and beam, of the shaft 42, pinion 43, dog 3, ratchet-wheel 4, segment 44, and stop 22, substantially as described.

41. The combination, with the scale-pan, its cradle and beam, of the shaft 42, pinion 43, dog 3, ratchet-wheel 4, segment 44, and stops 22 and 21, substantially as described.

42. The combination, with a weighing-scale the scale-pan whereof is automatically dumped during its descent, caused by the weight of material it contains, of a rotating table for receiving the dumped material, substantially as described.

43. The combination, with a weighing-scale the scale-pan whereof is automatically dumped by mechanism set into action by the descent of said scale-pan, of a rotating table carrying packers into which said dumped material is conveyed by means of tubes, as 96, substantially as described.

44. The combination, with a weighing-scale provided with mechanisms operated by the descent of the scale-pan to control the flow of material into said scale-pan, with mechanism for arresting the movement of the scale-pan when it has received its charge and is caused to descend by the weight thereof, so that it stands in a position to be dumped, with mechanism acting, when the scale-pan further descends, to cause it to be dumped, and with tripping mechanism the movement of which allows said descent to be resumed, of a rotating table adapted to receive the charge of material from the scale-pan, and mechanism carried by said table that operates at suitable times to move said tripping mechanism, substantially as described.

45. The combination, with the scale-pan S, its dumping mechanism, propelling or driving bar 24, wheels 25 26, stop 77, and lever 90, of the table 102 and its arm 98, substantially as described.

46. The combination, with the scale-pan S, its dumping mechanism, propelling or driving bar 24, wheels 25 26, and lever 90, of the rotating table 102, carrying a series of packers provided with tubes 96, levers 97, and arm 98, substantially as described.

47. The combination, with the bin or hopper A, of a stirrer the rotary movement of which is controlled by the resistance of the material contained in said bin or hopper, substantially as described.

48. The combination, with the bin or hopper and its rotating clearer 36, of the conical piece 106, suspended above said clearer, substantially as described.

In testimony whereof I have hereunto set my hand in the presence of two subscribing witnesses.

ORVILLE S. HARMON.

Witnesses:
T. H. PALMER,
H. T. MUNSON.